3,685,999
STABILIZED WET BABY FOOD

Vincent J. Kelly, Fremont, Mich., and William G. Fry, Worthington, Ohio, assignors to Gerber Products Company, Fremont, Mich.
No Drawing. Filed Jan. 23, 1969, Ser. No. 793,569
Int. Cl. A23l 1/10
U.S. Cl. 99—100                                                     3 Claims

ABSTRACT OF THE DISCLOSURE

A wet precooked baby food formulation thickened by including a non-waxy grain starch that has been at least partially modified with both bifunctional and monofunctional etherifying and/or esterifying agents. The formulation exhibits excellent cold stability characteristics during prolonged storage periods.

---

This invention relates to starch-containing precooked wet food products having a long shelf life and, more particularly, to the preparation of thickened wet precooked baby food formulations which exhibit uniform dispersion characteristics during lengthy low-temperature storage periods.

In the preparation of nutritious wet baby food formulations containing particles of meat and vegetables, it is necessary to incorporate a thickening agent such as starch to obtain a product attractive to the consumer. However, under the conditions normally present in this type of formulation, and as further intensified during prolonged periods of storage at low temperatures, naturally-occurring (unmodified) starches do not retain consistent gel characteristics.

In conventional practice, it has been found that certain starches such as a waxy maize (amioca) starch will maintain the desired cold stability in this type of wet formulation, provided that the amylopectin molecules in the starch are modified by cross-linking and acylating prior to introduction into the wet formulation; see for example, U.S. Pat. 2,935,510, issued May 3, 1960, where this "root-type" starch is modified by a combined reaction with a polyfunctional etherification or esterification reagent and a monofunctional esterification reagent. Waxy maize starch which has been treated in this manner has been combined with the aforementioned wet formulations to produce a ready-to-eat baby food which retains satisfactory cold stability for periods of at least about three years. However, waxy maize starch in its native form is considerably more expensive than other types of naturally-occurring grain starches. In addition, the waxy maize starches which are grown in the United States are not demostically available in certain foreign countries which prohibit or restrict the importation of non-domestic starches.

Naturally-occurring non-waxy grain starches such as corn, wheat, sorghum, rice and the like are not employed for the preparation of baby food formulations containing meat and/or vegetable particles as a portion of their composition is amylose molecules which suffer from linear association during prolonged storage especially at low temperatures. This linear association causes syneresis, i.e., a squeezing out of water, when the starch gel is subjected to the aforementioned storage conditions in combination with meat and/or vegetable particles. Thus, employing unmodified non-waxy grain starch to thicken the wet formulation results in a product having non-uniform dispersion characteristics and a generally unattractive appearance.

It has now been found that ungelatinized non-waxy grain starches which have been modified by at least partial reaction with both a bifunctional and monofunctional etherifying and/or esterifying agent can be incorporated with wet formulations of meat and/or vegetables to obtain ready-to-eat baby food formulations which have excellent cold stability over prolonged periods. In fact, when such modified grain starches, ordinarily in their non-peptized form, are incorporated with conventional baby food formulations prior to cooking, the resulting precooked product has been found to have rheological characteristics at least as beneficial as those present in a product propared through the use of the more expensive modified waxy maize starch. Most surprisingly, when a non waxy grain starch that has been modified (in an ungelatinized condition) with propylene oxide and epichlorohydrin is employed, the product of this invention has been found to be significantly superior in prolonged cold stability to wet baby food formulations prepared with modified waxy maize starch.

Non-waxy grain starches such as the naturally-occurring (unmodified) corn, sorghum, rice and wheat starches that are modified by the procedure disclosed in U.S. Pat. 2,853,484, issued Sept. 23, 1953, has been found to be particularly advantageous for inclusion with the aforementioned baby food formulations. Grain starches, modified as directed by this patent, have until now had limited food industry application in entirely unrelated products such as adult-type pie fillings and fruit flavored puddings which are only subject to storage periods of relatively insignificant duration. Therefore, it has not been apparent that the use of these modified grain starches would result in wet baby food formulations having the necessary prolonged cold stability.

As used in the following description, the term "bi- or polyfunctional agent" is intended to include those etherifying and esterifying agents that are capable of reacting with two or more hydroxyl groups of the starch molecule. Examples are set forth at column 3 of the aforementioned U.S. Pat. 2,853,484, and include bifunctional esterifying or etherifying (cross-linking) agents that include epihalohydrins such as epichlorohydrin wherein a single molecule of the agent can attach itself across a pair of starch molecules.

Again, the term "monofunctional agent" is intended to include well known monofunctional etherifying and esterifying agents, as also set forth at column 3 of U.S. Pat. 2,853,484, and include halogenated fatty acids, halogen hydrins, reactive epoxyalkanes, dialkylsulphates alkyl halides, polybasic acid anhydrides and the like. Specific materials found to be especially advantageous include epichlorohydrin, vinyl acetate and acetic anhydride. Finally, the term "inhibited starch" is intended to define non-waxy, non-gelatinized grain starch that has been at least partially reacted with each of the aforementioned agents.

Although it is not intended for the invention to be limited to any specific theoretical concept, it appears that the amylose molecules in the aforementioned baby food formulation form hydrogen bonds with themselves. This undesirable hydrogen bond formation results in an alignment and attachment of the amylose molecules and causes the aforementioned syneresis which reduces the volume of the starch-containing paste and, consequently, squeezes water out of the gelatinized formulation with the result that the product becomes non-uniform and unattractive for consumer distribution.

However, when non-waxy grain-type starches are first subjected to reaction with a monofunctional agent and thereafter further reaction with a bifunctional agent, chemical groups apparently attach themselves along the length of each amylose molecule and sterically inhibit hydrogen bond formation. Therefore, the undesirable hydrogen bond formation between amylose molecules is prevented and syneresis of the wet baby food formulation is minimized even during prolonged storage at subroom temperatures such as at about 40° F.

When inhibiting a non-waxy grain starch, such as corn starch by a process such as described in U.S. Pat. No. 2,853,484, the following procedure was employed: 1,000 grams of unmodified corn starch was added to 1,500 grams of distilled water, 8 grams of sodium hydroxide, and 2 grams of sodium chloride. The pH of the resulting suspension was found to be about 11.6. The temperature of the suspension was maintaied at about 25° C. so as to prevent gelatinization of the starch. The container was sealed to prevent escape of volatile reagents and 90 grams of propylene oxide were introduced. Other tests were run with 25–250 grams. The combination was allowed to react for 24 hours. Thereafter 1 gram of epichlorohydrin was introduced. Other tests were conducted with .3 to 3.0 grams of epichlorohydrin. After allowing the epichlorohydrin to react for about 8 hours, the pH of the suspension was reduced to 6.0 by adding dilute hydrochloric acid. The resulting suspension was filtered on a Büchner funnel containing Whatman No. 4 filter paper and resuspended twice in 2,000 grams of water. The resulting filter cake of modified starch was dried to equilibrium moisture content.

It will be apparent to one skilled in this art that the naturally occurring non-waxy grain starches do not have to be completely inhibited, i.e., either etherified or esterified, to produce the required steric hindrance. The amount or degree of substitution need not be great. For example, as little as 0.10 mole of ether or ester linkages/mole of anhydro-D-glucose unit has been found to provide a sufficient degree of substitution. It will be apparent to one skilled in this art that more extensive substitution can be utilized where the subsequent storage conditions will be especially prolonged and/or cold.

The wet precooked baby food formulation of this invention can be prepared by any of the methods well-known to those of skill in this art. For example, the formulation can be prepared by forming a slurry of the various sliced and ground meat particles, forming another slurry of strained vegetables and a further slurry of dry ingredients such as the modified grain starch, flour and seasoning. The slurries are then combined and the volume adjusted with water. The formulation is heated to gelatinize the starch and "commercially sterilize" the ingredients to obtain the desired reduction in bacteria count.

The amount of inhibited grain starch necessary to obtain a suitable consumer product of this type is consistent with the prior art use of modified waxy maize starch and is governed by the appearance desired as well as other practical considerations such as the particular vegetables and/or meat particles which are being combined. However, for purposes of illustration, inhibited starch in amounts from as little as about 5 to about 40 pounds per 100 gallons of final formulation can be employed, with about 20 pounds of the modified grain starch per 100 gallons having been found to produce an especially attractive product.

Illustrative of the types of vegetables and meat particles which are suitable in formulations prepared as set forth herein are carrots, corn, peas, tomatoes, split green peas, beans, veal, poultry, lamb, beef and pork. It will be obvious to one skilled in this art that many other vegetables and meat particles may be employed under similar process conditions. Again, the amount of the individual meat and vegetable ingredients included in the formulation will depend on the particular end product desired. However, as a practical matter, from 60–90% by weight of the components, other than water, should be meat and/or vegetables. This will usually amount to from about 150–225 pounds of meat and/or vegetables per 100 gallons of formulation.

Various types of flour, such as potato, wheat and the like, are also employed as described in conventional quantities such as 10–30 pounds per 100 gallons of formulation. Salt and other seasonings may also be incorporated in conventional amounts for their obvious advantages.

To further illustrate the invention, the following example is provided. Split green peas were included in the formulation because they are found to produce the most severely adverse conditions for retaining satisfactory cold stability over prolonged storage periods. It should be understood that the particular details of the example are not to be regarded as limitations as they may be varied as will be understood by one skilled in this art.

A strained meat-vegetable formulation was prepared in the following proportions:

| Ingredient: | Pounds of ingredients [1] |
|---|---|
| Carrots | 80 |
| Liver | 40 |
| Bacon | 20 |
| Tomato Puree | 40 |
| Inhibited corn starch [2] | 20 |
| Baked wheat flour | 15 |
| Peas, split green | 10 |
| Potato flour | 10 |
| Seasoning, etc. | 10 |
| | 245 |

[1] Per 100 gallons of formulation at 200° F.
[2] Modified according to process set forth supra.

The liver was passed through a Rietz extractor and an Autio grinder having 3/16″ plates. The meat was then slurried with hot water and the potato flour and split peas added thereto and the combined slurry pumped to a cone tank. The carrots were passed through a Robinson cutter and also collected in the cone tank. The mixture was adjusted to 10 gallons and precooked for five minutes at about 210° F.

The other dry ingredients, including tomato puree, were slurried with 15 gallons of cold water and passed through a finisher, then combined with the meat-vegetable slurry. Water was added at about 200° F. to adjust the volume to 100 gallons and the formulation was pumped into small glass containers and capped. The capped glass containers were then heated to about 250° F. (initial temperature, 160° F.) for about 40 minutes to insure adequate sterilization.

Similar packs of strained vegetables and liver were prepared employing modified waxy maize starch and unmodified corn starch. All the packs were placed in storage at 40° F., and samples of each were tested after eight weeks storage. The formulations were graded according to consistency, sheen and degree of water separation. The formulations prepared with the corn starch inhibited as set forth above was found to be at least equal to those prepared with the modified waxy maize starch. In fact, the formulation prepared in accordance with this invention displayed only trace amounts of water even after 52 weeks.

Although the foregoing invention has been described in some detail by way of illustration and example for purposes of clarity of understanding, it will be obvious that certain changes and modifications may be practiced within the scope of the invention, as limited only by the scope of the appended claims.

What is claimed is:

1. A process for preparing a thickened, wet, ready-to-eat baby food from an aqueous formulation containing particles of meat and vegetables, comprising the steps of: incorporating into said aqueous formulation from about 5 to 40 pounds per 100 gallons of final formulation of an ungelatinized non-waxy corn starch modified by reaction with propylene oxide and epichlorohydrin, said starch having been sufficiently modified to cause said aqueous formulation to maintain uniform cold stability characteristics during subsequent extended storage periods; filling and sealing containers with said aqueous formulation, and heating said starch-containing aqueous formulation for a period of time sufficient to commercially sterilize the formulation.

2. A process in accordance with claim 1 wherein sufficient modified corn starch is incorporated to insure uniform cold stability of the formulation during extended storage periods at a temperature of about 40° F.

3. A process in accordance with claim 1 wherein said formulation includes split green peas.

References Cited

UNITED STATES PATENTS

| 2,853,484 | 9/1953 | Lollama | 260—233.3 |
| 3,021,222 | 2/1962 | Kerr et al. | 99—139 |
| 3,437,493 | 4/1969 | Robinson et al. | 99—139 |
| 3,443,964 | 5/1969 | Maretta et al. | 99—83 |

RAYMOND N. JONES, Primary Examiner

U.S. Cl. X.R.

99—107